Nov. 27, 1928.
R. E. MEDEARIS
1,693,522
ELECTRIC STEAM TABLE
Filed Nov. 3, 1927   2 Sheets-Sheet 1
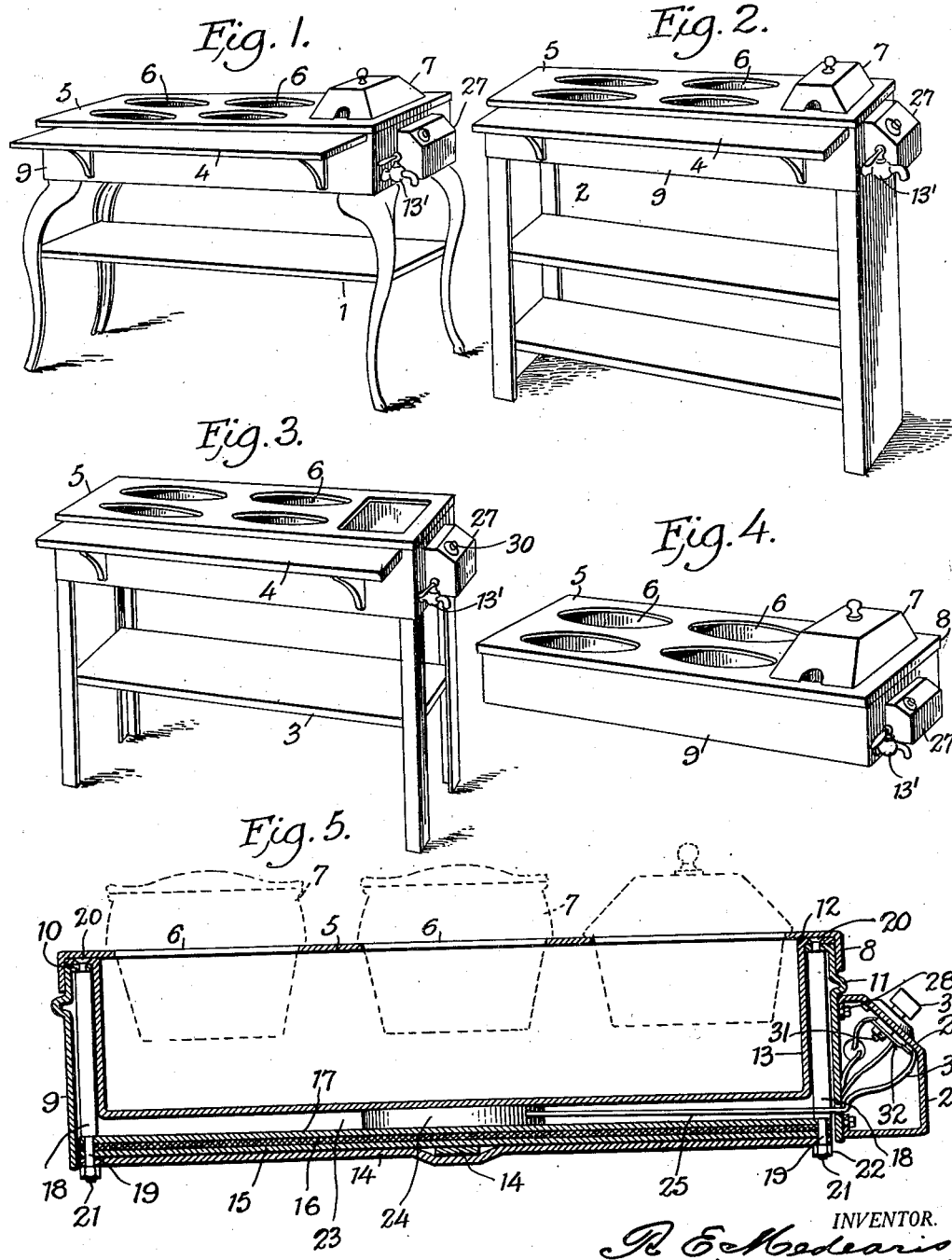

Nov. 27, 1928.
R. E. MEDEARIS
1,693,522
ELECTRIC STEAM TABLE
Filed Nov. 3, 1927
2 Sheets-Sheet 2
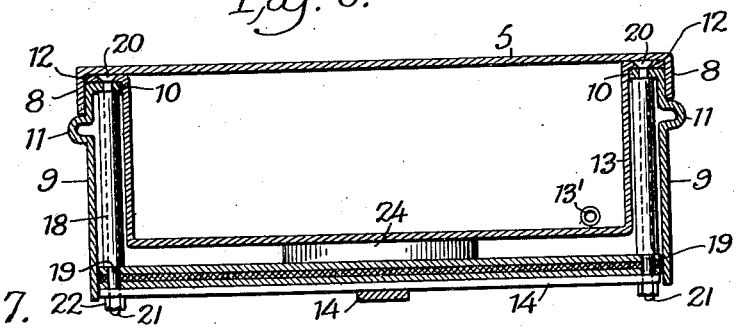
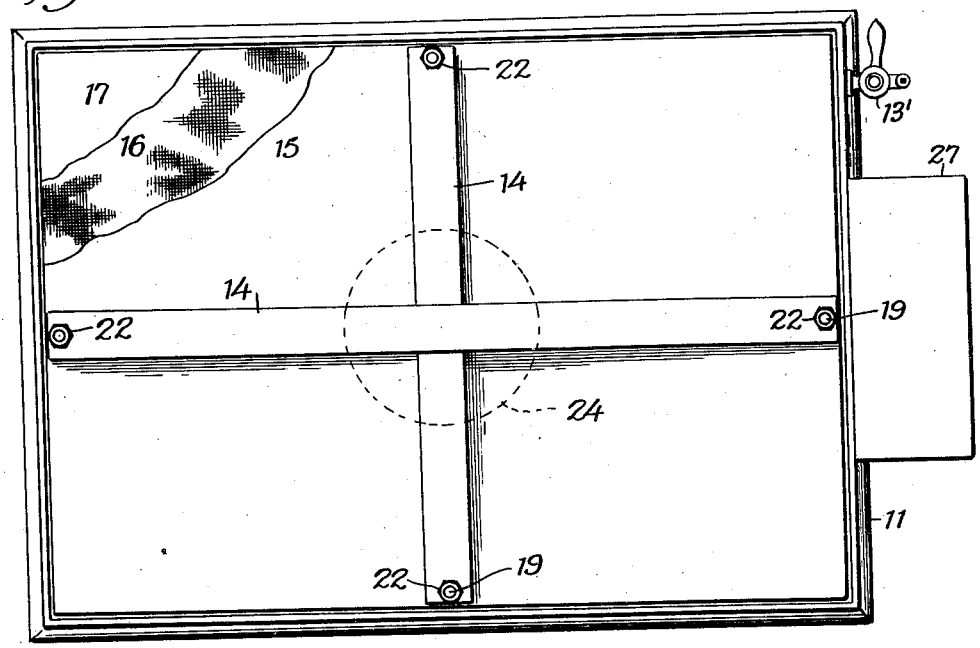
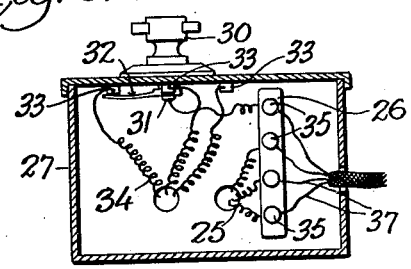

Patented Nov. 27, 1928.

1,693,522

UNITED STATES PATENT OFFICE.

ROBERT EARNEST MEDEARIS, OF NASHVILLE, TENNESSEE.

ELECTRIC STEAM TABLE.

Application filed November 3, 1927. Serial No. 230,840.

My invention relates to improvements in electric steam tables, and one object of my invention is the provision of an invention of this character which will occupy a small amount of space and still have a large capacity for service and which will be capable of perfect regulation of heat and easy to manipulate or control.

Another object is the provision of an electric steam table which will effect the cooking or heating of the food in a rapid manner and which with the use of a small amount of electric current will retain the food in a heated condition for a long time.

Another object is the provision of an electric steam table which may be made of any desired size or capacity and which may be composed of one or a series of units as found desirable and convenient.

Another object of my invention is the provision of an electric steam table which will be of ornamental and attractive appearance to prove an embellishment, which will be of simple, strong and durable construction and which in every respect will prove desirable, efficient and practical.

With these objects in view my invention consists of an electric steam table embodying novel features of construction and combination of parts, substantially as described and claimed and as shown in the accompanying drawings, in which:

Figure 1 represents a perspective view of a steam table constructed according to my invention and mounted in a certain design of table supporting structure.

Figure 2 represents a similar view in which another type or form of supporting table is used.

Figure 3 is a perspective view of still another form of supporting table is employed in connection with my invention.

Figure 4 is a perspective view of the complete electric steam table structure as a unit detached from a support.

Figure 5 is a vertical central longitudinal sectional view of my electric steam table, for purpose of detail being shown on an enlarged scale.

Figure 6 is a transverse sectional view of the electric steam table.

Figure 7 is a bottom plan view, and

Figure 8 is a detail of the switch box and contained mechanism which form the electric control mechanism of my invention.

Referring by numerals to the drawings in which the same numbers of reference are used to denote the same parts in all the views:

The numeral 1 designates one form of supporting table, the numeral 2 denotes a second type or form, and the numeral 3, designates a third construction of table or support, in connection with which my invention may be used and these tables preferably each have a supporting shelf along one side as 4, which may serve as a plate or other support.

The steam table structure as a whole consists of the top 5, provided with openings 6, to receive the food containing vessels 7, and formed with a surrounding rim or flange 8, which fits snugly over the upper edge of the box or casing 9, which is also formed at its upper edge with an inturned flange 10, and an outer surrounding bead 11, and between the top near its rim and the flange 10, snugly fits the surrounding flange 12, on the upper edge of the tank 13, thus forming a neat tight joint between the outer casing or box 9 and the tank 13, and the bottom of the structure is arranged below the tank and is of novel and peculiar construction and is composed of the extreme bottom braces 14, the plate 15, resting thereon, the asbestos lining 16, fitting on said plate 15, and finally the upper bottom plate 17, the whole forming the bottom of rigid, durable and heat sustaining material.

The bottom as just described and the tank and casing are secured in proper relation by means of the series of sleeves 18, forming supports and spacing means and the headed rods 19, which have their upper headed ends 20, engaging the flanges of the tank and casing and their lower threaded ends 21, passing through the entire bottom and extended beyond to receive the fastening nuts 22, as clearly shown in Figure 5.

The bottom structure is made secure and strong by means of the pair of cross braces 14, which are retained by the rods 19, as clearly shown in Figure 7, and the tank is provided with a cock or faucet $13^x$, and in the space 23, between the tank and upper layer of the bottom member is disposed the heating coil or unit 24, of any desired construction, heated from the current conductors 25, which are led from the support 26, in the box 27, which is bolted to one end of the casing as shown at 28, and in the inclined wall 29, of the switch box is mounted the knob 30, which carries at the lower end of its shaft 31, the finger 32, adapted to engage any one of the three contacts 33, from which lead the three current conducting wires 34, the support or bar 26, also having the series of posts or contacts 35, for the wire 36, leading from one of the contacts 33, and for the three feed wires 37, which lead to the main conductor, all as most clearly shown in Figure 8.

The construction and operation of my invention will be so readily and easily understood from the drawings taken in connection with the detailed description that a lengthy statement is deemed unnecessary, and it will be apparent that the tank is supplied with a suitable amount of water and that steam is generated from the coil or heating unit to produce steam which heats the receptacles and the food therein and also that the switch has three contacts to give three degrees of heat to suit the desires and convenience of the user and that the structure will occupy a small amount of space, is simple, strong and durable, inexpensive to make and sell, can be quickly assembled and taken apart, and that generally in all particulars the invention is practical and efficient.

I claim:

1. An electric steam table, consisting of a top having openings to receive food containers, an outer casing, a tank supported in spaced relation to said top and casing, a bottom composed of a series of plates, adjustable means for connecting the tank, casing and bottom, a heating unit between the bottom and tank, a switch box secured to the casing, a switch mounted therein, a series of contacts for said switch, and current feeding wires leading to said heating unit.

2. An electric steam table, consisting of a top having an outer surrounding flange, a tank having a surrounding horizontal flange, an outer casing having a horizontal flange fitting against said flange of the tank, a switch box secured to one end of said casing, a bottom structure composed of an upper plate, an interposed asbestos lining, a lower plate, and a series of braces, a series of rods having one end anchored in said bottom structure and braces and its other end anchored in the flanges of the tank and casing, a heating coil in the space between the upper plate of the bottom and the bottom of the tank, feed wires leading to said coil, and a switch arranged in said switch box for controlling the flow of current to the heating coil.

In testimony whereof I hereunto affix my signature.

ROBERT EARNEST MEDEARIS.